United States Patent
Pfersch

[15] 3,657,660
[45] Apr. 18, 1972

[54] ERROR DETECTING AND FAILURE INDICATING SYSTEM AND METHOD IN A SERVO LOOP

[72] Inventor: George H. Pfersch, Randolph Township Morris County, N.J.

[73] Assignee: The Bendix Corporation

[22] Filed: July 24, 1970

[21] Appl. No.: 62,215

[52] U.S. Cl. .................................328/148, 73/88.5, 324/65, 328/1, 338/4
[51] Int. Cl. .........................................................G06g 7/14
[58] Field of Search ............................................73/88.5, 398; 338/3-6; 324/65; 328/146-148, 1; 307/315, 235; 340/272

[56] References Cited

UNITED STATES PATENTS

| | | | |
|---|---|---|---|
| 3,193,762 | 7/1965 | Wu | 73/88.5 |
| 3,518,886 | 7/1970 | Talmo | 73/88.5 |
| 3,559,059 | 1/1971 | Martin | 73/88.5 |
| 3,350,927 | 11/1967 | Senour | 73/88.5 |
| 3,434,343 | 3/1969 | Senour | 73/88.5 |

Primary Examiner—Donald D. Forrer
Assistant Examiner—David M. Carter
Attorney—Herbert L. Davis and Plante, Hartz, Smith and Thompson

[57] ABSTRACT

An error detecting and failure indicating system and method in a servo loop in which an electrical bridge network is provided having a D.C. output to operate a differential amplifier, and a comparator including another differential amplifier responsive to both the D.C. output and an A.C. square wave reference voltage, one of the arms of the electrical bridge network being purposely unbalanced so as to provide over a predetermined control range of the servo loop a D.C. output signal voltage which may be varied over the control range in accordance with a sensed condition and which output signal voltage upon a failure arising in the system may exceed or decrease below preset limits of the predetermined control range set by the peaks of the A.C. square reference voltage so as to cause the differential amplifier of the comparator to provide a steady D.C. output voltage of a polarity dependent upon the sense of the failure arising in the system.

8 Claims, 3 Drawing Figures

ERROR DETECTING AND FAILURE INDICATING SYSTEM AND METHOD IN A SERVO LOOP

BACKGROUND OF THE INVENTION

1. Field of the Invention

This invention relates to an error detecting and failure indicating system and method applicable to a condition responsive electrical bridge network having a differential amplifier output applied to a fail safe servo loop configuration and a fail safe network in which the error detecting and failure indicating system of the present invention is utilized as a primary failure detection means of the servo loop.

2. Description of the Prior Art

While the error detecting and failure indicating system of the present invention may be applied generally to an electrical bridge network having a servo loop configuration and provided as a primary failure detection means of the servo loop, it is particularly applicable as a fail safe network for a semiconductor strain gage in an electrical bridge control network of a type such as has heretofore been utilized in manually operable aircraft flight controls.

Such prior aircraft controls have heretofore included solid state strain gages operably connected in a control stick so as to detect pilot applied forces on the control stick about two orthogonal axes, as disclosed and claimed in a U.S. Pat. No. 3,447,766 granted June 3, 1969 to Raymond D. Palfreyman and assigned to The Bendix Corporation, assignee of the present invention. Also prior manually operable aircraft control wheels have utilized an arrangement of strain gage transducers in a control wheel hub of a type such as disclosed and claimed in a U.S. Pat. No. 3,473,760 granted Oct. 21, 1969 to John C. Vaiden and also assigned to The Bendix Corporation, assignee of the present invention.

While such arrangements in a control stick force sensor and in a control wheel hub force sensor of strain gage transducers in electrical bridge networks as disclosed in the U.S. Pat. No. 3,447,766 and U.S. Pat. No. 3,473,760 have had applied such piezoresistive diodes in electrical control bridge networks for merely sensing forces applied to control elements, such piezoresistive diodes have also been advantageously combined in electrical control bridge networks arrangement for sensing the position of a control element as distinguished merely from the force applied thereto, as disclosed and claimed in a copending U.S. application, Ser. No. 743,660, now U.S. Pat. No. 3,576,302 filed July 10, 1968, by Raymond D. Palfreyman for a solid state position sensor for sensing an adjusted position of a control element, and which application has also been assigned to The Bendix Corporation, assignee of the present invention.

None of the disclosures of these prior references relate, however, to a fail safe network for such a semiconductor strain gage and its differential amplifier output, nor to a fail safe servo configuration in which such network is utilized as the primary failure detection means as well as the primary control of a servo loop through its force sensing capabilities, as in the subject matter of the present invention.

Heretofore there have been provided error detecting and indicating systems for monitoring redundant electrical control systems as disclosed and claimed in a U.S. Pat. No. 3,108,263 granted Oct. 22, 1963 to Frederick B. Sylvander and Robert J. Molnar; U.S. Pat. No. 3,289,193 granted Nov. 29, 1966 to Robert L. Worthington and Frank J. Thomas; U.S. Pat. No. 3,431,557 granted Mar. 4, 1969 to Frank J. Thomas and Robert L. Worthington; U.S. Pat. No. 3,454,849 granted July 8, 1969 to Albert T. Kirchhein and Louis J. Franchi; U.S. Pat. No. 3,467,956 granted Sept. 16, 1969 to Harold Moreines; and U.S. Pat. No. 3,482,231 granted Dec. 2, 1969 to Edward J. Florek et al., and all of which patents have been assigned to The Bendix Corporation, assignee of the present invention.

Furthermore in a U.S. Pat. No. 3,454,787 granted July 8, 1969 to Samson C. Gelernter, and assigned to The Bendix Corporation there has been disclosed and claimed an electronic monitoring and delay network to detect a predetermined and adjustable level of an error signal including, a somewhat complex arrangement of a feedback amplifier, sample and hold circuit and threshold detector combination for effecting an error signal level detection for a fault condition indication.

None of the disclosures of these references suggest the force sensor network of the present invention which provides a primary control for a servo loop through its force sensing capabilities, as well as provides a fail safe circuit for the semiconductor strain gage bridge network and differential amplifier output of the servo loop in the provision of a fail safe comparator network as the primary failure detection means of the servo loop.

The aforenoted references also fail to suggest an arrangement, as in the present invention, of an electrical control bridge network in which one of the arms is initially preset in an unbalanced relation so as to provide an output differential voltage over a predetermined normal operating range which may be detected by a differential amplifier having an output applied to a servo loop to control a servo motor and in which arrangement the output of the differential amplifier is also applied to an input of a fail safe A.C. Comparator to which there is applied an A.C. square wave reference voltage, the A.C. Comparator having a threshold determined by the amplitude of the A.C. square wave reference voltage so as to be effective for detecting failure conditions arising upon the servo loop energizing voltage falling out of the reference voltage range and thereupon rendering effective an output voltage from the comparator for operating a fault indicator device.

The present invention rests in a conception which simplifies the error detecting and failure indicating system for an electrical bridge network having a D.C. output differential amplifier applicable to a servo loop for operating a servo motor. In such system through the simple provision of an A.C. Comparator operably responsive to the D.C. output from the differential amplifier and an A.C. square wave voltage provided by a suitable reference voltage source, there is provided an output voltage from the A.C. Comparator to render effective a fault indicator upon a fault arising in a servo motor control loop. The simple arrangement of the present invention is such as to raise the percent of durability and certainty of operation of the failure indicating system and thereby effect a condition of greater durability and one which is more sure to produce the desired result in emergency and not only with greater certainty, but with less expense.

SUMMARY OF THE INVENTION

The present invention relates to a fail safe network for an electrical control bridge network of a type which may include a semiconductor strain gage and a differential amplifier providing an output to a fail safe servo configuration in which a fail safe network provides a primary failure detection means for the servo loop. Such primary failure detection means is operably controlled by the force sensing capabilities of the semiconductor strain gage in the electrical control bridge network in which one of the arms of the bridge network is initially purposely unbalanced so as to provide over the normal operating range of the semiconductor strain gage an output differential voltage which is detected by the differential amplifier for providing a controlling output signal voltage to the servo loop. There is also provided means to apply the output signal voltage from the differential amplifier to an input of a fail safe A.C. Comparator having a threshold value determined by the amplitude of an A.C. reference voltage applied to the A.C. Comparator so as to effect a D.C. output voltage for operating a fault warning device upon the threshold value of the reference voltage applied to the A.C. Comparator being exceeded in one or another sense by the amplitude of the output voltage applied to the A.C. Comparator from the differential amplifier.

An object of the present invention is to provide through such a fail safe network, means whereby all possible failures in the electrical circuitry of the servo loop may be detected and indicated to the operator.

A further object of the invention is to provide such a fail safe force sensor network in which during normal operation the output of the differential amplifier will be proportional to the force sensed by the semiconductor strain gage operatively connected in the electrical control bridge, plus a constant voltage value determined by a preset unbalance of the control bridge, in an arrangement in which an A.C. Comparator is so operated by an A.C. reference voltage as to provide an alarm signal, upon the output applied thereto by the differential amplifier being less than a minimum voltage value or more than a maximum voltage value, set by the A.C. reference voltage as compared with the output signal voltage from the differential amplifier by the A.C. Comparator.

Another object of the invention is to provide in such a servo loop a failure detection means in which all open wire failures of the electrical control bridge arms or output lines therefrom effect a hard-over excessive voltage signal at the output of the differential amplifier which will in turn cause the A.C. comparator to provide a constant D.C. output signal of one polarity sense to cause operation of a suitable fault warning indicator device, while on the other hand an open circuit from the supply voltage to the force sensor of the control bridge network or a short in such force sensor or in the output lines from the control bridge to the differential amplifier will be effective to cause the differential voltage applied at the output of the differential amplifier to be at a null or zero value whereupon the A.C. Comparator will apply at the output thereof a constant D.C. voltage of an opposite polarity sense to effect operation of the fault indicator device in response thereto in an opposite sense.

An additional object of the invention is to provide a predetermined electrically unbalanced strain gage control bridge providing electrical outputs applied to a differential amplifier having a differential voltage output which is in turn monitored by an A.C. Comparator in response to a square wave A.C. reference voltage so as to effect a D.C. fault indicator voltage at the output of the A.C. Comparator only upon the voltage at the output of the differential amplifier either exceeding in one sense or another the voltage range set by the A.C. reference voltage so that null or hard-over failures of the differential amplifier as well as an open wire connection from the output of the differential amplifier to the A.C. Comparator may in similar fashion be detected by the A.C. Comparator so as to effect a constant D.C. output signal of one sense or another to be applied to the fault indicator device so that the failure condition may be indicated to the operator.

These and other objects and advantages of the invention are pointed out in the following description in terms of the embodiment thereof which is shown in the accompanying drawings. It is to be understood however that the drawings are for the purpose of illustration only and are not a definition of the limits of the invention, reference being had to the appended claims for this purpose.

DESCRIPTION OF THE DRAWINGS

In the drawings in which corresponding numerals indicate corresponding parts.

DESCRIPTION OF A PREFERRED EMBODIMENT

Figure 1:
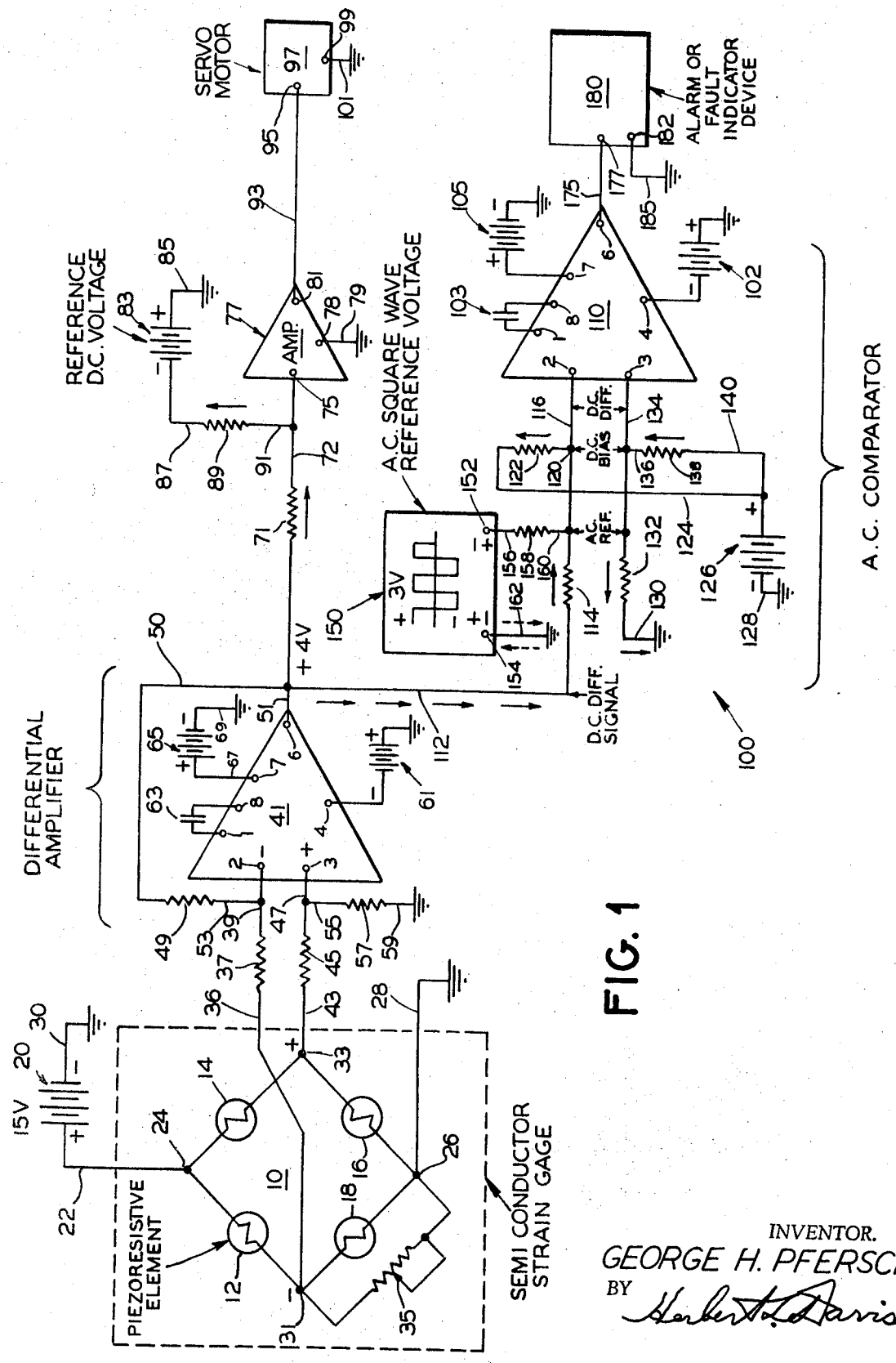
FIG. 1 is a schematic box diagram of a servo loop network to which there is applied an error detecting and failure indicating system, including an electrical bridge network having a differential amplifier in the loop network and an A.C. Comparator responsive to a D.C. output from the differential amplifier and an A.C. reference voltage to operate a fault indicator in accordance with the present invention.

Referring to the drawing of FIG. 1, there is shown schematically a servo loop including an electrical control bridge 10. The control bridge 10 may be of a semiconductor strain gage type which may be arranged for operation to detect pilot applied forces on a control stick or control wheel as disclosed and claimed in the aforenoted U.S. Pat. No. 3,447,766 and U.S. Pat. No. 3,473,760 or to sense the forces applied to a control element in an arrangement for sensing the position of the control element, as distinguished from merely the force applied thereto, as described and claimed in the aforenoted U.S. application Ser. No. 743,660, filed July 10, 1968, by Raymond D. Palfreyman.

As illustrated schematically in FIG. 1, the semiconductor strain gage 10 may include four piezoresistive elements 12, 14, 16 and 18 arranged in the bridge network 10, as shown by FIG. 1, so that each piezoresistive element provides one of the arms of the bridge network 10.

The bridge network 10 is excited by a D.C. source of electrical energy or battery 20 having a positive terminal connected by a conductor 22 to a terminal 24 connected intermediate the piezoresistive elements 12 and 14 of the bridge network 10. An opposite terminal 26 of the bridge network 10 is connected by a conductor 28 to ground and thereby through a grounded conductor 30 to the negative terminal of the battery 20. The battery 20 is specified, by way of example, as providing a supply voltage of plus 15 volts which is referenced to ground.

As shown schematically in FIG. 1, the bridge network 10 has signal output terminals 31 and 33. The output terminal 31 is connected in the bridge network 10 between the piezoresistive elements 12 and 18, while the output terminal 33 is connected in the bridge network 10 between the piezoresistive elements 14 and 16. Moreover in order to effect operation of the failure detection means, as hereinafter explained, the bridge network 10 is purposely preset in an unbalanced relation so as to provide a predetermined differential in the voltage applied across respective negative and positive output terminals 31 and 33 upon the respective piezoresistive elements being in a normal null force or condition sensing relation.

This preset unbalanced relation of the bridge network 10, as shown in FIG. 1, may be designed into the network 10 in a conventional manner or may be effected by the provision of an additional variable shunting resistor 35 connected between the excitation terminal 26 and the output terminal 31 so that the arm of the bridge network 10, as defined by the piezoresistive element 18, is purposely unbalanced in relation to the piezoresistive elements 12, 14 and 16 so as to effect a predetermined differential voltage across the output terminals 31 and 33 under a null force or condition sensing operation. The predetermined differential output voltage applied across the output terminals 31 and 33 of the bridge network 10 is preset by a suitable adjustment of the resistance value of the variable resistor 35 relative to the piezoresistive elements of the bridge network 10 so as to effect a negative output at the terminal 31 and a positive output at terminal 33 to provide such predetermined null conditioned sensed differential voltage.

A conductor 36 leads from the differential negative output terminal 31 of the bridge network 10 through a resistor 37 and conductor 39 to a negative input terminal 2 of a differential amplifier indicated generally by the numeral 41. An opposite electrical conductor 43 leads from the differential positive voltage output terminal 33 of the bridge network 10 through a resistor 45 and a conductor 47 to an opposite positive input terminal 3 of the differential amplifier 41.

Figure 2:
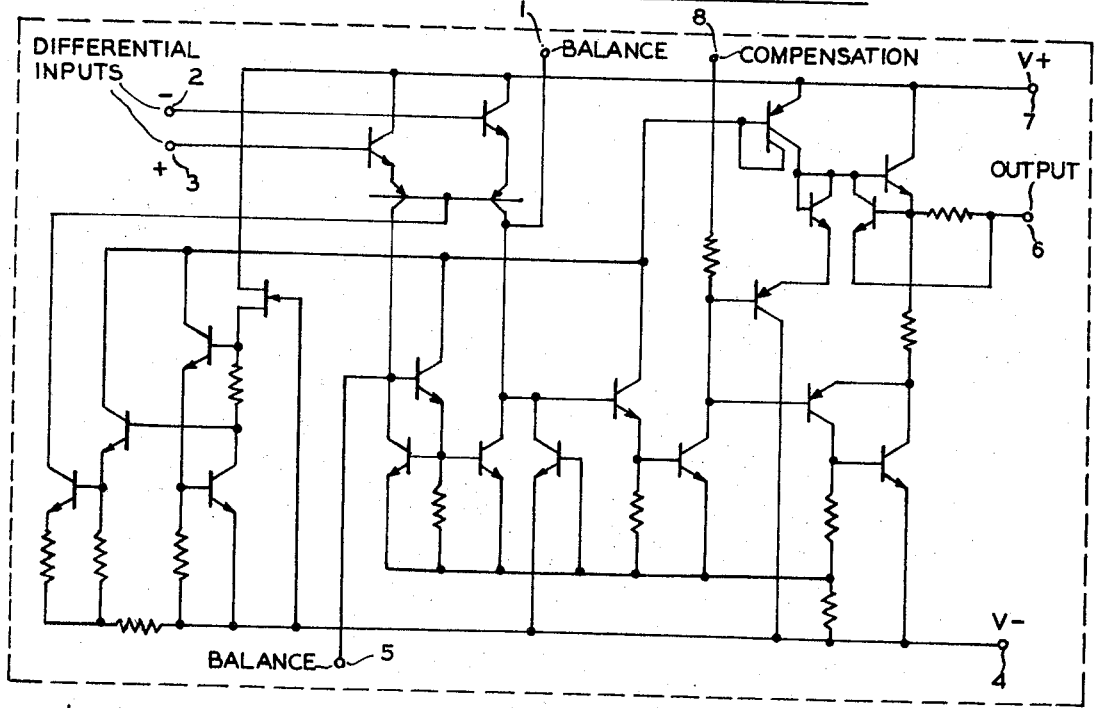
FIG. 2 is a detailed wiring diagram of an operational amplifier of a type which may be embodied in the system of FIG. 1, as indicated therein, and which may be of a type LM 101A having operational characteristics as set forth in detail in a bulletin of Oct. 1968, of the National Semiconductor Corporation, and in which drawing of FIG. 2 corresponding numerals indicate corresponding terminals of the operational amplifiers as shown in the system of FIG. 1.

The differential amplifier 41 may be of a conventional type or the amplifier 41 be a general purpose operational amplifier of the type LM 101A shown in detail in FIG. 2 and the operational characteristics of which have been set forth in detail in the bulletin of Oct. 1968 of the National Semiconductor Corporation, as heretofore explained. Corresponding terminals of the differential amplifier 41 of FIG. 1 and the operational amplifier of FIG. 2 have been indicated by like numerals so as to indicate corresponding terminals to the terminals of the operational amplifier type LM 101A generally described in the aforenoted bulletin. A.C.

Further controlling the unbalanced relationship of the bridge network 10 from the preset value determined by the adjustment of the variable resistor 35, are the piezoresistive elements 12, 14, 16 and 18 in opposite arms of the bridge network 10.

Piezoresistive elements 12, 14, 16 and 18 may be of any suitable semiconductor types, such as piezoresistive type strain gages which effect a change of electrical resistance when tension or compressive stress is applied thereto. Thus as explained in the aforenoted U.S. Pat. No. 3,447,766 one of the strain gages of the bridge network 10 may be arranged on one side of a spring section of a pilot's control stick so that when the spring section of the pilot's control stick is under compression another of the strain gages arranged on an opposite side of the spring section will be under tension so that as the spring section flexes resultant changes in the resistance of the strain gages will be a measure of the flexure of the spring section. The changes in the resistance of the strain gages as applied to the bridge network 10 of the present invention will cause the differential output voltage across the lines 36 and 43 to be either increased or decreased relative to the normal preset differential voltage, dependent upon the sense of the flexure of the spring section of the pilot's control stick sensed by the variations in the resistance of the piezoresistive elements 12, 14, 16 and 18 in response to the flexure thereof. In the aforenoted operation, the resistance of one strain gage will increase and the resistance of the other strain gage will decrease to provide predetermined variations in the negative voltage applied to the terminal 31 and the positive voltage applied to the terminal 33 and thereby vary the differential output from the bridge network 10 in which the strain gages are connected.

Further, as shown schematically in FIG. 1, a positive feedback connection, including a resistor 49 is connected by a conductor 50 from an output conductor 51 leading from a positive output terminal 6 of the differential amplifier 41 and connected through the resistor 49 and a conductor 53 to the conductor 39 leading to the negative input terminal 2 of the amplifier 41. Such feedback resistor 49 serves to provide a positive feedback from the positive output conductor 51 of the amplifier 41 through the conductor 39 to the negative input terminal 2 of the differential amplifier 41. Furthermore the positive input conductor 47 leading to the positive terminal 3 of the differential amplifier 41 is connected by a conductor 55 to a resistor 57 which is in turn connected through a conductor 59 to ground and thereby returned through the grounded conductor 30 to a negative terminal of the battery or source of electrical energy 20.

A V− terminal 4 of the differential amplifier 41, shown in detail by FIG. 2, is connected, as shown by FIG. 1, to a negative terminal of a source of electrical energy or battery 61 having a positive terminal connected to ground. Further there is connected across a balance terminal 1 and a compensation terminal 8 of the differential amplifier 41 a capacitor 63, while a positive terminal of a source of electrical energy or battery 65 is connected to a V+ terminal 7 of the differential amplifier 41 with the negative terminal of the battery 65 being connected to ground. The positive terminal of the battery 61 and the negative terminal of the battery 65 are connected to ground so as to provide a common input-output grounded connection for the differential amplifier 41 to which the input terminals 2 and 3 thereof are referenced.

It will be seen from the foregoing that in the normal null sensor relation of the bridge network 10 there will be applied through the predetermined unbalanced bridge network 10 a predetermined differential voltage across the respective negative and positive input terminals 2 and 3 of the differential amplifier 41. This differential voltage will in turn effect a predetermined positive voltage output at the line 51 indicated, by way of example, as plus four volts; and which positive output voltage may in turn be applied through a resistor 71 and conductor 72 to an input terminal 75 of an amplifier 77 which may be of a conventional type having an input-output terminal 78 connected through a conductor 79 to ground and an opposite output terminal 81.

Further there is provided a source of a D.C. reference voltage or battery 83 having a positive terminal connected by a conductor 85 to ground and thereby through the grounded conductor 79 to the input-output terminal 78 of the amplifier 77 and a negative terminal connected by a conductor 87 through a resistor 89 and conductor 91 to the conductor 72 leading to the input terminal 75 of the amplifier 77.

The resistors 71 and 89 provide summing resistors which are so selected and arranged that the normal positive preset differential output voltage applied at the output line 51 through the summing resistor 71 to the input conductor 72 is in effect nulled at the input conductor 72 by the negative reference voltage applied through the summing resistor 89 by the source of reference D.C. voltage 83 under the normal or null sensor operating conditions of the bridge network 10.

It will be seen then that upon the bridge network 10 being in the preset unbalanced null sensor condition there will be effected a null voltage output signal across the output terminals 81 and 78 of the amplifier 77. An output conductor 93 leads from the output terminal 81 of the amplifier 77 to an input terminal 95 of a D.C. servomotor 97 which may be of conventional type, having an opposite input terminal 99 connected to ground through a conductor 101 and thereby through the grounded output conductor 79 to the opposite output terminal 78 of the amplifier 77.

In the operation of the semiconductor strain gage bridge network 10 from the preset unbalanced null sensor condition, it will be seen that a strain may be applied thereto so as to cause the resistance of the piezoresistive element 14 and 18 to be varied in one sense while the resistance of the opposite piezoresistive elements 12 and 16 are varied in an opposite sense. Thus the resistance of the element 14 and 18 may be decreased, while the resistance of the elements 12 and 16 are increased so as to in effect further the unbalanced condition of the bridge network 10 in such a sense that the positive output applied through the piezoresistive element 14 to the conductor 43 is increased in relation to the negative bias applied at the conductor 36 through the piezoresistive element 18 and shunting resistor 35 so that there is effected an increase in the differential voltage applied across the output lines 36 and 43 leading to the respective negative input terminal 2 and positive input terminal 3 of the differential amplifier 41. This in turn will effect a corresponding increase in the positive voltage applied at the output terminal 6 of the differential amplifier 41. This positive output voltage applied at the terminal 6 will then be applied through the output conductor 51 and the summation resistor 71 so as to exceed the reference voltage applied through the summation resistor 89 by the negative reference D.C. voltage source or battery 83 causing in turn a positive difference signal to be applied to the input terminal 75 of the amplifier 77 causing the motor 97 to be driven in a predetermined sense by the output voltage applied through the output conductor 93 leading from the amplifier 77.

Upon the bridge network 10 being unbalanced in an opposite sense from that heretofore described with reference to the preset null sensor value, as upon a tension being applied to the strain gage in an opposite sense, the resistance of the piezoresistive elements 14 and 18 will be increased while the resistances of the piezoresistance elements 12 and 16 are simultaneously decreased. It will be seen then that the positive output applied to the output conductor 43 will be effectively decreased. Thereupon the differential voltage applied across the lines 36 and 43 leading to the respective negative terminal 2 and positive terminal 3 of the amplifier 41 will be decreased. Such action will in turn decrease the predetermined positive output voltage applied at the output terminal 6 of the differential amplifier 41 and thereby to the output line 51.

Thereupon the negative D.C. reference voltage applied by the battery 83 through the resistance 89 will exceed that of the output voltage applied through the resistor 71 from the output conductor 51 so that the input line 72 leading to the input terminal 75 of the amplifier 77 will assume a negative bias proportional to such difference causing an output signal to be applied across the output lines 93 and 79 of the amplifier 77 and thereby to the input terminals 95 and 99 of the D.C. servomotor 97 in an opposite sense causing rotation of the D.C. servomotor 97 in an opposite direction from that heretofore described.

ERROR DETECTING AND FAILURE INDICATING SYSTEM

The present invention is directed to an error detecting and failure indicating system by means of which a failure in the servo loop, including the semiconductor variable resistor elements of the strain gage 10 and the differential amplifier 41 may be readily detected. Thus in the normal operation of the differential amplifier 41, as heretofore explained, the differential output across the output terminals 4 and 6 of the differential amplifier 41 is proportional to the force sensed by the semiconductor strain gage bridge 10, plus a constant value determined by the preset unbalance of the bridge network 10 which may be effected by the adjustment of the variable shunting resistor element 35.

The predetermined constant value of the unbalance in the bridge network 10 is so arranged as to provide a preset positive output voltage at the line 51, of for example +4 volts, proportional to the voltage difference between the positive input terminal 3 and the negative input terminal 2 of the differential amplifier 41. The bridge network 10 is further so arranged that the semiconductor strain gages 12, 14, 16 and 18 may sense changes in the forces applied thereto, as heretofore explained, so as to provide variations in the preset unbalanced voltage applied at the output line 51 of the differential amplifier 41. This preset output voltage, of for example +4 volts, may be varied in response to the force applied to the strain gage bridge network 10 in one sense so as to be decreased to a +1 volt minimum and in another sense so as to be increased to a +7 volt maximum.

A feature of the invention resides in the provision of an A.C. Comparator indicated generally by the numeral 100 and which may include a differential amplifier 110 of a conventional type or the amplifier 110 may be a general purpose operational amplifier of the type shown in detail in FIG. 2, and which may be of a type LM 101A having the operational characteristics set forth in the bulletin of Oct. 1968 of the National Semiconductor Corporation.

The A.C. Comparator 100 in addition to the differential amplifier 110 includes suitable summing resistors and D.C. and A.C. reference sources so arranged as to provide, as hereinafter explained, an alarm signal voltage at the output of the differential amplifier 110 upon the output from the differential amplifier 41 being less than a predetermined minimum, of for example +1 volt, or greater than a predetermined maximum, of for example +7 volts. Such minimum and maximum output voltages are provided at the limits of the force sensor range (+4$^v$ ±3$^v$) of the strain gage bridge network 10.

Thus a zero output from the differential amplifier 41 will cause the A.C. Comparator 100, as hereinafter explained, to provide an alarm signal output of one sense, while an excessive output from the differential amplifier 41, for example in excess of +7 volts, would cause the differential amplifier 110 of the A.C. Comparator 100 to provide an alarm signal output of another sense.

The differential amplifier 110, is shown of the type heretofore described with reference to FIG. 2, and includes the V− terminal 4 connected to a negative terminal of a source of electrical energy or battery 102 having a positive terminal connected to ground. Further there is connected across the balance terminal 1 and the compensation terminal 8 of the differential amplifier 110 a capacitor 103, while a positive terminal of a source of electrical energy or battery 105 is connected to the V+ terminal 7 of the differential amplifier 110 with the negative terminal of the battery 105 being connected to ground in the circuitry as shown with reference to FIG. 2. The positive terminal of the battery 102 and the negative terminal of the battery 105 are connected to ground so as to provide a common input-output connection for the differential amplifier 110 to which the input terminals 2 and 3 thereof are referenced.

In effecting the foregoing alarm operation of the A.C. Comparator 100, it may be noted that there leads from the output conductor 51 of the amplifier 41, a conductor 112 which is in turn connected into the A.C. Comparator 100 and through a summing resistor 114 and a conductor 116 to the input terminal 2 of the differential amplifier 110 of the A.C. Comparator 100. Further the conductor 116 is connected through a conductor 120, summing resistor 122 and conductor 124 to a positive terminal of a source of electrical energy or battery 126 having a negative terminal connected through a conductor 128 to ground.

The summing resistors 114 and 122 are so selected that in the normal null sensor condition of the bridge network 10, the predetermined positive output voltage, of for example +4 volts, applied at the output line 51 and through the summing resistor 114 will be effectively summed with the positive biasing voltage applied through the summing resistor 122 by the battery 126 so that there is in effect applied at the input conductor 116 and to the input terminal 2 of the differential amplifier 110 of the A.C. Comparator 100 a positive summation signal voltage during the normal null sensor condition of the bridge network 10 of an equal value to that of a positive biasing voltage applied to the opposite input terminal 3 of the differential amplifier 110. There is then no resultant voltage difference between the positive voltages applied at the terminals 2 and 3 of the differential amplifier 110 under such null sensor condition of operation of the bridge network 10, as shown graphically by FIG. 3.

This positive biasing voltage applied to the input terminal 3 of the differential amplifier 110 is effected by a voltage dividing effect provided by resistors 132 and 138 connected across the battery 126 so as to apply the positive biasing voltage of such equivalent value to the input terminal 3.

Thus the summing resistor 132 is connected to a grounded conductor 130 and through a conductor 134 to the input terminal 3 of the differential amplifier 110 of the A.C. Comparator 100, while the conductor 134 is connected through a conductor 136, summing resistor 138 and conductor 140 to a positive terminal of the battery 126 having the negative terminal connected to ground through the conductor 128 and thereby through the grounded conductor 130 to the summing resistor 132.

The summing resistors 132 and 138 are so selected and arranged as to provide voltage dividing resistors connected across the battery 126 to effectively apply through the resistors 132 and 138 from the battery 126 through the conductor 134 to the input terminal 3 of the differential amplifier 110 a preset biasing voltage of the aforenoted value equal to that of the positive summation signal voltage applied to the opposite input terminal 2 of the differential amplifier 110 during the null sensor condition of operation of the bridge network 10.

Thus the resistors 114 and 122 as well as the resistors 132 and 138 are so selected that during the normal null sensor operation of the bridge network 10, there is applied no resultant differential D.C. voltage between the input terminals 2 and 3 of the differential amplifier 110.

However also applied across the conductor 116 and the conductor 134 leading to the input terminals 2 and 3 respectively of the differential amplifier 110 is an alternating current square wave reference voltage applied by an A. C. square wave source 150 of a conventional type having output terminals 152 and 154. The source 150 applies alternate positive and negative half cycle square waves, of for example +3 and −3 volts, across the input terminal 2 and 3 of the differential amplifier 110.

The output terminal 152 of the A.C. source 150 is connected by a conductor 156, summing resistor 158 and conductor 160 to the conductor 116 leading to the input terminal 2 of the differential amplifier 110. The opposite output terminal 154 of the A.C. source 150 is connected through a conductor 162 to ground and thereby to the grounded positive terminal of the battery 102 and negative terminal of the battery 105 providing the common input-output terminal of the differential amplifier 110, while the source 150 is also connected through the grounded conductor 162 to the grounded conductor 130, resistor 132 and conductor 134 leading to the opposite input terminal 3 of the differential amplifier 110.

Figure 3:
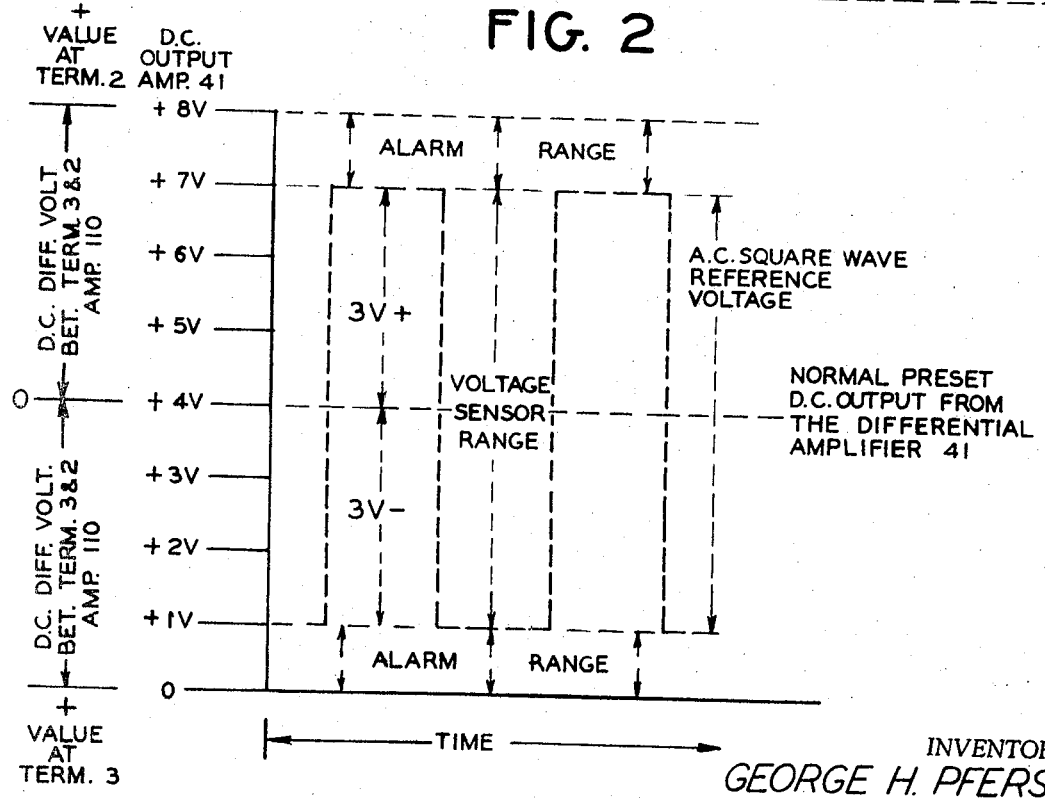
FIG. 3 is a graphical illustration showing the relationship of the A.C. square wave reference voltage to the normal preset D.C. output from the differential amplifier and indicating alarm ranges above and below the normal sensor range of the semiconductor strain gage as set by the A.C. square wave reference voltage in an application of one form of the invention, as illustrated and described herein.

Such alternating current square wave reference voltage applied by the source 150 through the summing resistor 158 to the input terminal 2 and through summing resistor 132 to the input terminal 3 of the differential amplifier 110 determines the normal operating range and effective alarm range of the strain gage bridge network 10, as shown graphically by FIG. 3.

Thus during the normal null sensor operation of the bridge 10, there would be no D.C. difference control signal voltage applied across the input terminals 2 and 3 of the differential amplifier 110 so that the A.C. square wave reference voltage applied from the source 150 through the resistors 158 and 132 across the input terminals 2 and 3 effects an alternating difference voltage which will be fully effective to provide at the output terminal 6 of the differential amplifier 110 a square wave output voltage which is alternately driven between predetermined positive and negative saturation levels, as indicated graphically by FIG. 3.

This square wave output voltage may be effectively modified however upon a change in the D.C. difference control signal voltage resulting from an algebraic sum of the condition sensor voltage and the biasing voltage applied through the respective summing resistors 114 and 122 as compared to the preset D.C. biasing voltage applied through the voltage dividing summing resistors 132 and 138 by the battery 126.

Thus as the condition sensor voltage applied at the output terminal 6 of the differential amplifier 41 varies in its normal operating range, of for example from +1 volt to +7 volts, the resultant D.C. difference control signal voltage applied across the input terminals 2 and 3 of the differential amplifier 110 would not exceed the alternating square wave reference voltage, supplied by the A.C. source 150 so as to provide a greater A.C. difference voltage between the input terminals 2 and 3 of the differential amplifier 110 than the resultant D.C. differential voltage. Thus the amplified output at the output terminal 6 of the differential amplifier 110 would over the normal operating range be governed by the A.C. square wave reference voltage to provide at the output terminal 6 thereof an alternative positive and negative square wave voltage output under such normal operating range conditions.

However upon the condition sensor voltage applied at the output line 51 from the differential amplifier 41 being at a value, of from example +8 volts or zero volts, either exceeding or decreasing below the normal operating range, than it may be seen that the algebraic sum of the sensor and biasing voltage applied through the summing resistors 114 and 122 to the input terminal 2 of the differential amplifier 110 as compared to the preset biasing voltage applied by the battery 126 through the voltage dividing resistors 132 and 138 to the input terminal 3 would result in a D.C. difference control signal voltage applied across the input terminals 2 and 3 in a positive or negative sense, respectively, which would exceed the peak value of the A.C. difference voltage applied across the terminals 2 and 3 of the differential amplifier 110 in said positive or negative senses. Thereupon the A.C. square wave reference voltage supplied by the source 150 may no longer swing the output at the output terminal 6 of the differential amplifier 110 between both polarities of the square wave reference voltage. Thereupon the output at the terminal 6 of the differential amplifier 110 becomes a steady positive D.C. control signal voltage upon the sensor voltage at the output line 51 decreasing below the normal operating range (zero voltage) causing the input terminal 3 to approach a maximum positive value relative to the input terminal 2 of the differential amplifier 110.

Conversely the output at the terminal 6 of the differential amplifier 110 becomes a steady negative D.C. control signal voltage upon the sensor voltage at the output line 51 increasing above the normal operating range (+8 volts) causing the input terminal 2 to approach a maximum positive value relative to the input terminal 3 of the differential amplifier 110. Thus the polarity of the output D.C. alarm signal voltage applied at the output conductor 175 of the differential amplifier 110 will depend upon whether the sensor voltage applied at the output line 51 from the differential amplifier 41 be at a value decreasing below (zero voltage) or exceeding (+8 volts) the normal operating range. The loss of the square wave output and the provision of the steady D.C. control signal voltage at the output terminal 6 of the differential amplifier 110 provides an alarm signal voltage.

The alarm signal voltage is in turn applied through an output conductor 175 leading from the output terminal 6 of the differential amplifier 110 to an input terminal 177 of a suitable alarm or fault indicator device 180 having an opposite input terminal 182 connected through a conductor 185 to ground and thereby to the common input-output ground connection of the differential amplifier 110 and which leads to the respective positive and negative terminals of the batteries 102 and 105 providing the source of electrical energy for the output conductor 175 leading to the indicator device 180 controlled by the differential amplifier 110, as heretofore explained The alarm or fault indicator device 180 may be of a suitable type so arranged as to provide a visual or audible alarm in response to the aforesaid steady D.C. control signal voltage applied at the output of the differential amplifier 110, while being unaffected by a square wave output voltage indicative of operation of the semiconductor strain gage bridge network 10 within the normal operating range.

The alarm or fault indicator device 180 may also be of a suitable type arranged to provide an alarm or fault indication of one type in response to a steady negative D.C. control signal voltage being applied at the output conductor 175 as upon a hard-over signal, of for example +8 volts, at the output conductor 51 of the differential amplifier 41 in excess of the normal operating range; while the indicator device 180 may be arranged to provide an alarm or fault indication of another type upon a steady positive D.C. control signal voltage being applied at the output conductor 175, as upon an open circuit from the voltage source 20 to the bridge network 10. The latter failure resulting in an opposite alarm signal, as upon for example a zero voltage output at the output conductor 51 of the differential amplifier 41 well below that of the normal operating range, as indicated graphically by FIG. 3.

OPERATION

From the foregoing, it will be seen that in the fail safe servo configuration of the present invention, there has been provided a bridge network 10 which is utilized as the primary failure detection means of the servo loop as well as a condition sensing control in which the arms of the bridge network 10 have been arranged in a preset unbalanced relation so as to provide a variable differential voltage output between lines 36 and 43 which is detected by the differential amplifier 41. The output of this differential amplifier 41 then feeds a fail safe A.C. Comparator 100 having a threshold determined by the amplitude of an A.C. reference voltage.

A basic objective of the invention is to provide such a system in which all possible failures may be detected. In the normal operation, the differential output of lines 36 and 46 is proportional to the force or condition sensed by the semiconductor strain gage 10, plus a constant determined by the preset unbalance of the bridge 10. The constant in this case has been designed, by way of example to provide a +4 volt output at the output of the differential amplifier 41. The A.C. Comparator 100 is arranged to alarm if the output of the differential amplifier 41 is less than +1$^v$ or more than +7$^v$, (+4$^v$ ±3$^v$). Thus a zero output at the differential amplifier 41 alarms the A.C. Comparator 100. Such failure is indicated by a steady positive D.C. output at the conductor 175 of the comparator 100 instead of its normal A.C. square wave output.

The failure detection capability of the invention is best described by considering various type of failures. All open wire failures of the arms of the bridge 10 or lines 36 or 43 will cause a hard-over signal, of for example +8 volts, at the output conductor 51 of the differential amplifier 41 which in turn causes the A.C. Comparator 100 to alarm by providing a steady negative D.C. output at the conductor 175. An open circuit in the supply voltage or ground wire to the force sensor or a short circuit therein will in turn cause the differential voltage between the lines 36 and 43 to drop to a zero voltage, as will a short between lines 36 and 43.

Thus a zero output at the output conductor 51 of amplifier 41 alarms the A.C. Comparator 100; while null or hard-over failures of the differential amplifier 41 and an open wire to the A.C. Comparator 100 are also detected. The A.C. Comparator 100 in itself is fail safe.

There is thus provided a novel error detecting and failure indicating system and method including in conjunction with an unbalanced condition sensing bridge 10, a differential amplifier 41 driven by an output from the bridge 10 and providing an output monitored by an A.C. Comparator 100 which is in turn controlled by an A.C. square wave reference voltage provided by an A.C. source 150 to effect an error detection and failure indication by a steady D.C. alarm voltage at the output conductor 175 of one polarity under failure conditions of one sense and a steady D.C. alarm voltage at the output conductor 175 of an opposite polarity under failure conditions of another sense.

What is claimed is:

1. In a servo loop of a type including a D.C. control bridge network, condition sensing means to operate said bridge network to provide a D.C. difference output voltage proportional to said sensed condition, and a differential amplifier operative by said D.C. difference output voltage to provide a resultant D.C. output signal voltage to control the servo loop; and error detecting and failure indicating system comprising the control bridge network being normally electrically unbalanced so as to provide a D.C. difference output voltage of a preset amplitude, said control bridge network being operated by said condition sensing means to vary said D.C. difference output voltage in proportion to said sensed condition, a source of an A.C. square wave voltage, means to compare the A.C. square wave reference voltage with the D.C. difference output voltage, said comparing means including differential voltage responsive control means effective upon the D.C. difference output voltage exceeding a predetermined operating range in relation to the square wave reference voltage in at least one sense to provide a steady D.C. difference output voltage upon the detecting of an error in an operating condition of the servo loop, and means operable by the steady D.C. output voltage for indicating a failure in the servo loop.

2. The error detecting and failure indicating system defined by claim 1 in which the comparing means includes D.C. biasing means to nullify the effect of the D.C. difference output voltage applied to the differential voltage of a preset amplitude responsive control means, said control means being thereupon responsive to said A.C. square wave reference voltage to provide an A.C. square wave output voltage under null error detecting operating conditions of the servo loop, said D.C. biasing means being effective upon said D.C. difference output voltage being varied from said preset value to a value in excess of said predetermined operating range upon detecting an error in the operating condition of the servo loop, whereupon said control means provides a steady D.C. output voltage of a polarity dependent upon the sense that the D.C. difference output voltage exceeds said predetermined operating range during the detecting of the error in the operating condition of the servo loop, and means operable by the steady D.C. output voltage and the polarity thereof for indicating a failure in the servo loop and the sense of the error detected in the operating condition of the servo loop.

3. The error detecting and failure indicating system defined by claim 2 in which the differential voltage responsive control means includes a differential amplifier including first and second input terminal means and an output terminal means, the D.C. biasing means includes a source of D.C. biasing voltage, a first resistor network for algebraically summing the D.C. biasing voltage from said D.C. source with the variable D.C. difference output voltage from the D.C. control bridge network and applying said summation voltage to the first input terminal means of the differential amplifier, a second voltage divider resistor network connected across said source of D.C. biasing voltage for applying a constant D.C. biasing voltage to said second input terminal means of the differential amplifier, the D.C. biasing voltage applied to said second input terminal means by the second voltage divider resistor network being of a voltage value equal to the voltage applied by the first summation network to the first input terminal means upon the D.C. difference output voltage from the D.C. control bridge network being of the aforesaid preset amplitude so as to thereupon effect a resultant null difference between the D.C. input voltages applied to said first and second terminal means of the differential amplifier, and means connecting the source of A.C. square wave voltage to the first and second resistor networks and thereby across the first and second terminal means of the differential amplifier for effecting a comparison between the square wave reference voltage and the resultant D.C. voltage difference between the D.C. input voltages applied at the first and second input terminal means of the differential amplifier, said differential amplifier being selectively operable in a first sense to provide at the output terminal means of the differential amplifier an A.C. square wave output voltage corresponding to that of the A.C. square wave reference voltage upon said resultant D.C. voltage difference being less than a predetermined operating range relative to the A.C. square wave reference voltage in opposite positive and negative polarity senses, said differential amplifier being selectively operable in a second sense to provide at the output terminal means of the differential amplifier a steady state D.C. output voltage of one polarity sense upon the aforesaid resultant D.C. voltage difference exceeding said predetermined operating range relative to the A.C. square wave reference voltage in said positive polarity sense, and said differential amplifier being selectively operable in a third sense to provide at the output terminal means of the differential amplifier a steady state D.C. output voltage of an opposite polarity sense upon the aforesaid resultant D.C. voltage difference exceeding said predetermined operating range relative to the A.C. square wave reference voltage in said negative polarity sense, and the indicating means being operable only by said steady state D.C. output voltage for indicating a failure in the servo loop and by the polarity of the steady state D.C. output voltage for indicating the sense of the error detected in the operating condition of the servo loop.

4. A method of detecting an error and indicating a failure in a servo loop comprising the steps of initially unbalancing an electrical bridge network so as to provide a preset D.C. differential output voltage under a null sensed condition, further unbalancing the electrical bridge network so as to vary the D.C. differential output voltage in accordance with a sensed condition to provide a D.C. differential output control voltage for operating the servo loop, and detecting an error in the servo loop by applying a biasing voltage of an equal amplitude and in an opposing nullifying sense to that of said preset D.C. differential output voltage, providing an A.C. square wave reference voltage, algebraically summing the A.C. square wave reference voltage with said D.C. differential output control voltage, providing a steady resultant D.C. summation voltage upon the D.C. differential output control voltage exceeding a predetermined amplitude relative in one sense to that of the A.C. square wave reference voltage on the detecting of the error in the servo loop and of a polarity indicating the sense of the detected error in the servo loop.

5. The method defined by claim 4 including the steps of providing the resultant D.C. summation voltage of one polarity sense upon the D.C. differential control voltage exceeding in a positive sense a predetermined amplitude relative to that of the A.C. square wave reference voltage; and providing the resultant D.C. summation voltage of an opposite polarity sense upon the D.C. differential control voltage exceeding in an opposite negative sense a predetermined amplitude relative to that of the A.C. square wave reference voltage.

6. In a control network, a combination comprising an unbalanced condition sensing bridge network normally providing first and second output voltages of a preset value, a first differential amplifier driven by the output voltages from the bridge network, said output voltages being variable from said preset value in a sense dependent upon the condition sensed by the bridge network, the first differential amplifier providing a third output voltage for effecting a control function; means to monitor said third output voltage including a comparator network having input means connected to the third output voltage from the first differential amplifier, a second differential amplifier having a pair of input means and an output means, an A.C. source providing a square wave reference voltage, the comparator network being effectively controlled by the AC square wave reference voltage provided by the A.C. source, the comparator network applying across the pair of output means of the second differential amplifier a D.C. differential voltage variable from a preset null value in a sense dependent upon the condition sensed by the bridge network and the resulting third output voltage effective over a normal operating range, the comparator network being rendered effective to cause said D.C. differential voltage to exceed a threshold value upon a detection of an error in the control network causing the third output voltage to be effective in a range other than said normal operating range, said threshold value being set by the A.C. square wave reference voltage controlling the comparator network, and upon the D.C. differential voltage exceeding said threshold value the second differential amplifier becomes effective to apply at the output means of the second differential amplifier a steady state D.C. alarm voltage indicative of the error arising in the control network causing the D.C. differential voltage to exceed said threshold value.

7. In a control network, the combination defined by claim 6 in which the comparator network includes a means for applying a D.C. biasing voltage, means for summing the D.C. biasing voltage with the monitored third output voltage to provide a variable summation control voltage applied by the comparator network to one of the pair of input means of the second differential amplifier, and other means for applying a D.C. biasing voltage to the other of said pair of input means of said second differential amplifier to set the preset null value of the D.C. differential voltage applied by the comparator network across the pair of input means of the second differential amplifier.

8. In a control network, the combination defined by claim 7 in which the comparator network includes means for applying the square wave reference voltage from the A.C. source across the summing means and the other means for applying a D.C. biasing voltage so as to provide an A.C. square wave differential voltage alternately effective across the pair of input means of the second differential amplifier to set the threshold value of the comparator network.

* * * * *